United States Patent
Kikuchi

(10) Patent No.: US 9,711,008 B2
(45) Date of Patent: Jul. 18, 2017

(54) GAME SYSTEM, CONTROL METHOD FOR GAME SYSTEM, GAME CONTROL DEVICE, CONTROL METHOD FOR GAME CONTROL DEVICE, AND INFORMATION STORAGE MEDIUM

(71) Applicant: KONAMI DIGITAL ENTERTAINMENT CO., LTD., Tokyo (JP)

(72) Inventor: Keita Kikuchi, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 635 days.

(21) Appl. No.: 14/038,786

(22) Filed: Sep. 27, 2013

(65) Prior Publication Data

US 2014/0094311 A1    Apr. 3, 2014

(30) Foreign Application Priority Data

Sep. 28, 2012 (JP) .................................. 2012-218105

(51) Int. Cl.
*A63F 9/24*          (2006.01)
*A63F 13/00*         (2014.01)
(Continued)

(52) U.S. Cl.
CPC ........ *G07F 17/3274* (2013.01); *A63F 13/795* (2014.09); *A63F 13/812* (2014.09)

(58) Field of Classification Search
CPC ............... G07F 17/326; G07F 17/3262; G07F 17/3295; G07F 17/3274; A63F 13/12; A63F 13/795; A63F 13/812
(Continued)

(56) References Cited

U.S. PATENT DOCUMENTS

2005/0239538 A1* 10/2005 Dixon ................. G07F 17/3267
463/20
2006/0100019 A1*  5/2006 Hornik .................... G07F 17/32
463/42
(Continued)

FOREIGN PATENT DOCUMENTS

JP      2010-022494 A      2/2010

OTHER PUBLICATIONS

Fantasy Earth, The Ring of Dominion Beginners, Play guide, LOGiN 2006, April edition, special supplement, ENTERBRAIN Brand Company, Apr. 1, 2006, pp. 2-9. (For concise explanation of relevance please see the partial translation of Office Action for corresponding Japanese Patent Application No. 2012-218105 dated Sep. 24, 2014.).
(Continued)

*Primary Examiner* — Omkar Deodhar
*Assistant Examiner* — Wei Lee
(74) *Attorney, Agent, or Firm* — Hubbs, Enatsky & Inoue PLLC

(57) ABSTRACT

A game system executes a game for a plurality of users to participate in. A role assigning unit assigns a role in a game to a user. An evaluation unit evaluates a game play of the user in the game, based on an evaluation criterion that is set based on a role assigned to the user by the assigning unit. A limiting unit limits a number of users, other than the user, who are able to participate in the game, based on an evaluation result by the evaluation unit on a game play of the user in a game in the past.

13 Claims, 13 Drawing Sheets

(51) Int. Cl.
*G06F 17/00* (2006.01)
*G06F 19/00* (2011.01)
*G07F 17/32* (2006.01)
*A63F 13/795* (2014.01)
*A63F 13/812* (2014.01)

(58) Field of Classification Search
USPC .................................................. 463/40, 42
See application file for complete search history.

(56) References Cited

U.S. PATENT DOCUMENTS

| 2007/0066403 | A1* | 3/2007 | Conkwright | A63F 13/10 |
| | | | | 463/43 |
| 2008/0039211 | A1* | 2/2008 | Terada | A63F 13/12 |
| | | | | 463/43 |
| 2010/0144424 | A1* | 6/2010 | Rogers | A63F 13/10 |
| | | | | 463/23 |
| 2011/0244953 | A1* | 10/2011 | Pekau | G06Q 10/101 |
| | | | | 463/29 |

OTHER PUBLICATIONS

The partial translation of Office Action for corresponding Japanese Patent Application No. 2012-218105 dated Sep. 24, 2014.

* cited by examiner

| USER ID | PASSWORD | COMMUNICATION TERMINAL INFORMATION | STATE | UPPER LIMIT PARTICIPANT NUMBER LEVEL |
|---|---|---|---|---|
| U1 | — — — | — — — | — — — | 2 |
| U2 | — — — | — — — | — — — | 2 |
| U3 | — — — | — — — | — — — | 2 |
| U4 | — — — | — — — | — — — | 2 |
| ... | ... | ... | ... | ... |

| USER ID | TIME AND DATE | PARTICIPATING USER | MATCH RESULT | EVALUATION RESULT |
|---------|---------------|--------------------|--------------|--------------------|
| U1 | --- | --- | --- | 80 |
| U1 | --- | --- | --- | 60 |
| U1 | --- | --- | --- | 65 |
| U1 | --- | --- | --- | 68 |
| ... | ... | ... | ... | ... |

| UPPER LIMIT PARTICIPANT NUMBER LEVEL | UPPER LIMIT PARTICIPANT NUMBER | EVALUATION VALUE(e) |
|---|---|---|
| 1 | 2 PERSONS | $0 \leq e < E1$ |
| 2 | 4 PERSONS | $E1 \leq e < E2$ |
| 3 | 8 PERSONS | $E2 \leq e < E3$ |
| 4 | 16 PERSONS | $E3 \leq e < E4$ |
| 5 | 22 PERSONS | $E4 \leq e$ |

FIG.11

| POSITION | EVALUATION CRITERIA | | |
|---|---|---|---|
| | PLAY TYPE, OBJECTIVE | ADDITION/SUBTRACTION CLASSIFICATION | VALUE |
| FW | TO SCORE | ADDITION | 20 |
| | TO SHOOT | ADDITION | 5 |
| | POSITIONED IN ITS OWN AREA WHEN TEAMMATE PLAYER HOLDS BALL IN OPPONENT AREA | SUBTRACTION | 10 |
| | ... | ... | ... |
| MF | ------- | ADDITION | 10 |
| | ... | ... | ... |
| DF | TO TAKE BALL FROM OPPONENT TEAM PLAYER | ADDITION | 5 |
| | POSITIONED IN OPPONENT AREA WHEN OPPONENT TEAM PLAYER HOLDS BALL IN THEIR OWN AREA | SUBTRACTION | 10 |
| | ... | ... | ... |
| GK | ------- | ADDITION | 10 |
| | ... | ... | ... |

FIG.12

| USER | EVALUATION VALUE |
|---|---|
| U1 | 30 |
| U2 | 25 |
| U3 | 35 |
| U4 | 15 |

FIG.13

| POSITION | GAME PLAN | EVALUATION CRITERIA | | |
|---|---|---|---|---|
| | | PLAY TYPE, OBJECTIVE | ADDITION/SUBTRACTION CLASSIFICATION | VALUE |
| FW | COUNTER ATTACK | ----- | ADDITION | 10 |
| | | ----- | SUBTRACTION | 10 |
| | | ... | ... | ... |
| | SIDE ATTACK | ----- | ADDITION | 15 |
| | | ... | ... | ... |
| | CENTRAL BREAKTHROUGH | ----- | ADDITION | 5 |
| | | ... | ... | ... |
| MF | COUNTER ATTACK | ----- | ADDITION | 15 |
| | | ... | ... | ... |
| | SIDE ATTACK | ----- | ADDITION | 5 |
| | | ... | ... | ... |
| | CENTRAL BREAKTHROUGH | ----- | ADDITION | 10 |
| | | ... | ... | ... |
| DF | COUNTER ATTACK | ----- | ADDITION | 10 |
| | | ... | ... | ... |
| | SIDE ATTACK | ----- | ADDITION | 10 |
| | | ... | ... | ... |
| | CENTRAL BREAKTHROUGH | ----- | ADDITION | 15 |
| | | ... | ... | ... |
| GK | COUNTER ATTACK | ----- | ADDITION | 5 |
| | | ... | ... | ... |
| | SIDE ATTACK | ----- | ADDITION | 15 |
| | | ... | ... | ... |
| | CENTRAL BREAKTHROUGH | ----- | ADDITION | 10 |
| | | ... | ... | ... |

FIG.15

| USER ID | UPPER LIMIT PARTICIPANT NUMBER LEVEL | UPPER LIMIT PARTICIPANT NUMBER |
|---|---|---|
| U1 | 2 | 4 PERSONS |
| U2 | 2 | 4 PERSONS |
| U3 | 2 | 4 PERSONS |
| U4 | 2 | 4 PERSONS |
| U5 | 1 | 2 PERSONS |
| U6 | 1 | 2 PERSONS |
| U7 | 4 | 16 PERSONS |
| U8 | 3 | 8 PERSONS |

GAME SYSTEM, CONTROL METHOD FOR GAME SYSTEM, GAME CONTROL DEVICE, CONTROL METHOD FOR GAME CONTROL DEVICE, AND INFORMATION STORAGE MEDIUM

CROSS-REFERENCE TO RELATED APPLICATION

The present application claims priority from Japanese application JP 2012-218105 filed on Sep. 28, 2012, the content of which is hereby incorporated by reference into this application.

TECHNICAL FIELD

The present invention relates to a game system, a control method for a game system, a game control device, a control method for a game control device, and an information storage medium.

BACKGROUND ART

There has been known a game in which a plurality of users participate. For example, there is known a game system for executing a soccer game in which a plurality of users participate (see JP2010-022494A, for example).

SUMMARY OF INVENTION

Technical Problem

In the above mentioned soccer game, a poorly trained user who cannot perform a game play as would be expected of their position (role) or a malicious user who does not intend to perform a game play that would be expected of their position may participate in the soccer game. For example, a user participating in a soccer game may keep attacking while neglecting defense even when the user is operating a defender (DF) player character. Presence of such a user may displease other users. In a soccer game in which many users are participating, in particular, many users may feel displeased by the presence of some users.

The present invention has been conceived in view of the above, and aims to provide a game system, a control method for a game system, a game control device, a control method for a game control device, and an information storage medium capable of preventing many other users from feeling displeased by the presence of a user not performing a game play in accordance with their assigned part.

Solution to Problem

In order to achieve the above described object, a game system according to one aspect of the present invention is a game system for executing a game for a plurality of users to participate in, the game system including an assigning unit that assigns a role in the game to a user; an evaluation unit that evaluates a game play of the user in the game, based on an evaluation criterion that is set based on the role assigned to the user by the assigning unit; and a limiting unit that limits a number of users, other than the user, who are able to participate in the game in which the user participates, based on an evaluation result by the evaluation unit on a game play of the user in a game in the past.

A control method for a game system according to another aspect of the present invention is a control method for a game system for executing a game for a plurality of users to participate in, the control method including assigning a role in the game to a user; evaluating a game play of the user in the game, based on an evaluation criterion that is set based on the role assigned to the user; and limiting a number of users, other than the user, who are able to participate in the game in which the user participates, based on an evaluation result on a game play of the user in a game in the past.

A game control device according to another aspect of the present invention is a game control device for providing a game for a plurality of users to participate in, the game control device including an obtaining unit that obtains content stored in a storage that stores evaluation information on an evaluation result of a game play of a user in the game, the evaluation result being obtained by evaluating the game play of the user in the game based on an evaluation criterion that is set based on a role assigned to the user in the game; and a limiting unit that limits a number of users, other than the user, who are able to participate in the game in which the user participates, based on the evaluation information of the user.

A control method for a game control device according to another aspect of the present invention is a control method for a game control device for providing a game for a plurality of users to participate in, the control method including obtaining content stored in a storage that stores evaluation information on an evaluation result of a game play of a user in the game, the evaluation result being obtained by evaluating the game play of the user in the game based on an evaluation criterion that is set based on a role assigned to the user in the game; and limiting a number of users, other than the user, who are able to participate in the game in which the user participates, based on the evaluation information of the user.

A program according to another aspect of the present invention is a program for causing a computer to function as a game control device for providing a game for a plurality of users to participate in, the program causing the computer to obtain content stored in a storage that stores evaluation information on an evaluation result of a game play of a user in the game, the evaluation result being obtained by evaluating the game play of the user in the game based on an evaluation criterion that is set based on a role assigned to the user in the game; and limit a number of users, other than the user, who are able to participate in the game in which the user participates, based on the evaluation information of the user.

A non-transitory computer readable information storage medium according to another aspect of the present invention is a non-transitory computer readable information storage medium storing the above mentioned program.

BRIEF DESCRIPTION OF DRAWINGS

FIG. 11 shows one example of evaluation criterion data;

FIG. 12 shows one example of an evaluation value table;

FIG. 13 shows one example of evaluation criterion data;

FIG. 15 shows one example of a user requesting to play in a game;

DESCRIPTION OF EMBODIMENTS

In the following, an example of an embodiment of the present invention will be described in detail with reference to the accompanying drawings.

Figure 1:
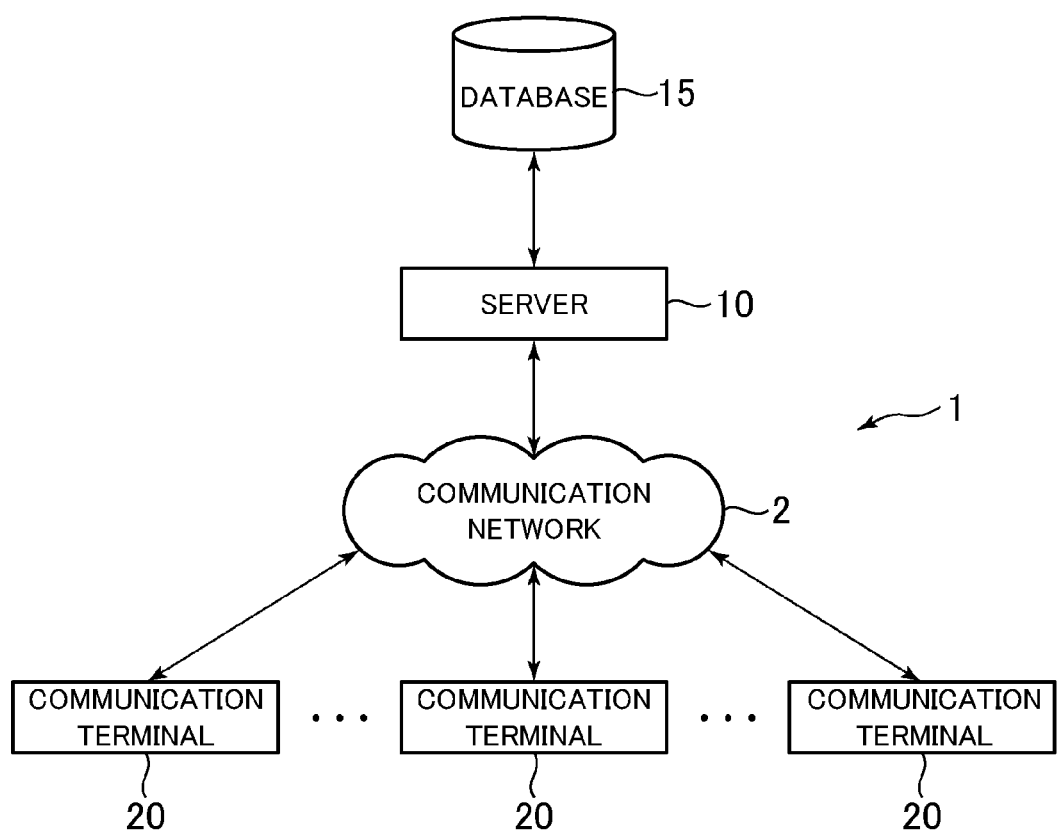
FIG. 1 shows an overall structure of a game system according to an embodiment of the present invention.

FIG. 1 shows an overall structure of a game system according to an embodiment of the present invention. As shown in FIG. 1, a game system 1 according to this embodiment includes a server 10 and a plurality of communication terminals 20. The server 10 and the communication terminal 20 are connected to a communication network 2, so that the server 10 and the communication terminal 20 can execute data communication with each other. Moreover, data communication is also possible between the communication terminals 20.

Figure 2:
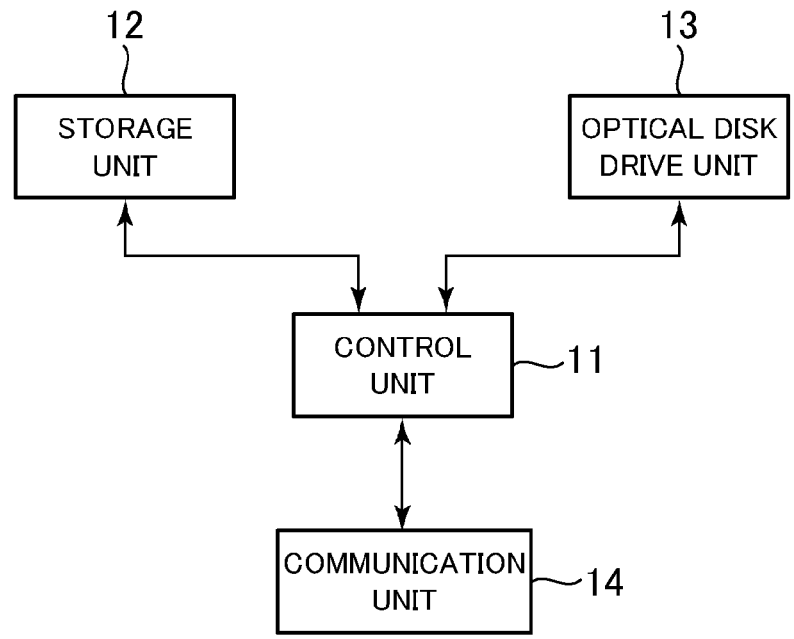
FIG. 2 shows a hardware structure of a server.

The server 10 is a server computer, for example. FIG. 2 shows a hardware structure of the server 10. As shown in FIG. 2, the server 10 includes a control unit 11, a storage unit 12, an optical disk drive unit 13, and a communication unit 14.

The control unit 11 includes, for example, a microprocessor or the like, and executes processing according to an operating system or other program. The storage unit 12 includes a main memory unit (for example, a RAM) and an auxiliary storage unit (for example, a hard disk drive or a solid state drive). The optical disk drive unit 13 reads a program and data recorded on an optical disk (an information storage medium). The communication unit 14 is an interface for connection to the communication network 2.

As shown in FIG. 1, the server 10 can access the database 15. The database 15 may be created in the server 10 or a server computer different from the server 10. Indispensable data for providing a game is stored in the database 15. The data stored in the database 15 will be described later.

Figure 3:
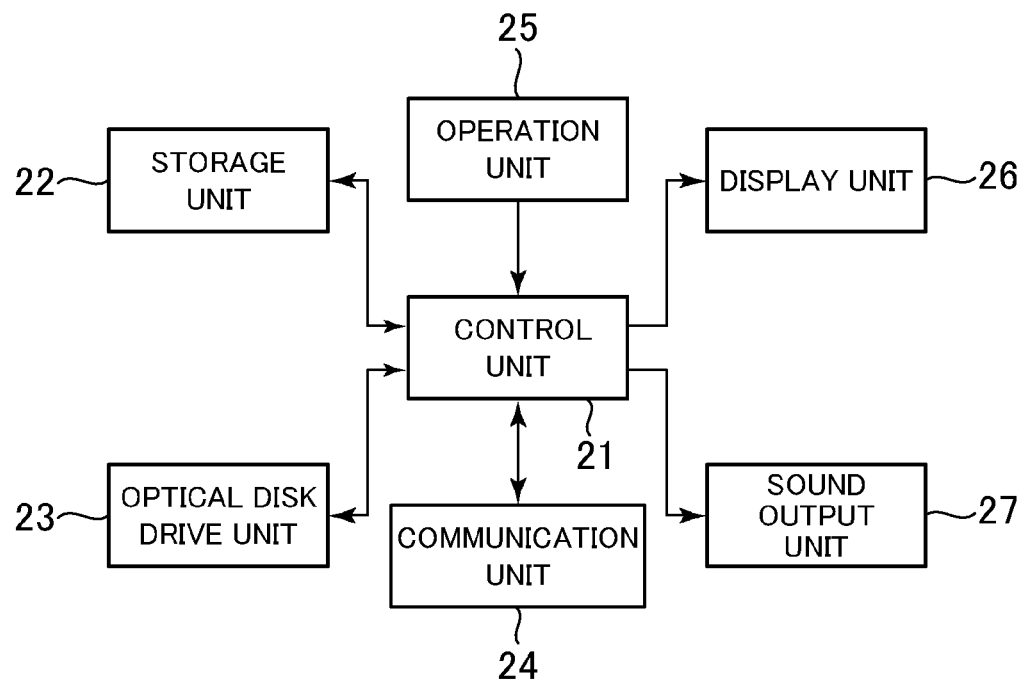
FIG. 3 shows a hardware structure of a communication terminal.

The communication terminal 20 is a computer for use by a user, in particular, a computer for use by a user to play a game. The communication terminal 20 is, for example, a consumer game device (an installation type game device), a portable game machine, a portable phone (including a smart phone), a portable information terminal, or a personal computer. FIG. 3 shows a hardware structure of the communication terminal 20. As shown in FIG. 3, the communication terminal 20 includes a control unit 21, a storage unit 22, an optical disk drive unit 23, a communication unit 24, an operation unit 25, a display unit 26, and a sound output unit 27.

The control unit 21, the storage unit 22, the optical disk drive unit 23, and the communication unit 24 are similar to the control unit 11, the storage unit 12, the optical disk drive unit 13, and the communication unit 14, respectively, of the server 10. The operation unit 25 includes, for example, a game controller, a key, a lever, a touch panel, a mouse, or the like, and is used by a user to perform a game operation. Note that the operation unit 25 may be used by a user to perform a game operation using sound or gestures. The display unit 26 is, for example, a liquid crystal display panel, an organic EL display, or the like, and displays a screen according to an instruction from the control unit 21. The sound output unit 27 is, for example, a speaker, a headphone, or the like, and outputs sound data according to an instruction from the control unit 21.

A program and data are supplied to the server 10 or the communication terminal 20 via an optical disk. The server 10 or the communication terminal 20 may include a structural component for reading a program or data stored in an information storage medium (for example, a memory card) other than an optical disk. Further, a program and data may be supplied to the server 10 or the communication terminal 20 via an information storage medium other than an optical disk. Alternatively, a program and data may be supplied from a remote place to the server 10 or the communication terminal 20 via the communication network 2.

In the game system 1, a game participated in by a plurality of users is executed. For example, a game in which a plurality of users are matched with one another, a game in which a plurality of users cooperatively aim to accomplish a predetermined objective, or the like, is executed.

For example, in the game system 1, initially, a combination of a plurality of users to participate in a game is automatically decided by the server 10 before starting a game for the plurality of users to participate in.

In the following, a soccer game participated in by a plurality of users will be described as an example of a game participated in by a plurality of users. Note that twenty-two users at most can participate in the soccer game. Below, a case in which four users U1, U2, U3, U4 participate in a soccer game will be described.

In a soccer game in which the users U1 to U4 participate, for example, a match is played between a soccer team A cooperatively operated by the users U1 to U4 and a soccer team B operated by a computer. Alternatively, a match may be played between a soccer team A cooperatively operated by the users U1 to U3 and a soccer team B operated by the user U4 or between a soccer team A cooperatively operated by the users U1 and U2 and a soccer team B operated by the users U3 and U4.

Below, a case will be described in which a match is played between a soccer team A cooperatively operated by the users U1 to U4 and a soccer team B operated by a computer. Further, below, the respective communication terminals 20 used by the users U1, U2, U3, U4 will be referred to as a "communication terminal U1", a "communication terminal U2", a "communication terminal U3", and "a communication terminal U4".

Figure 4:
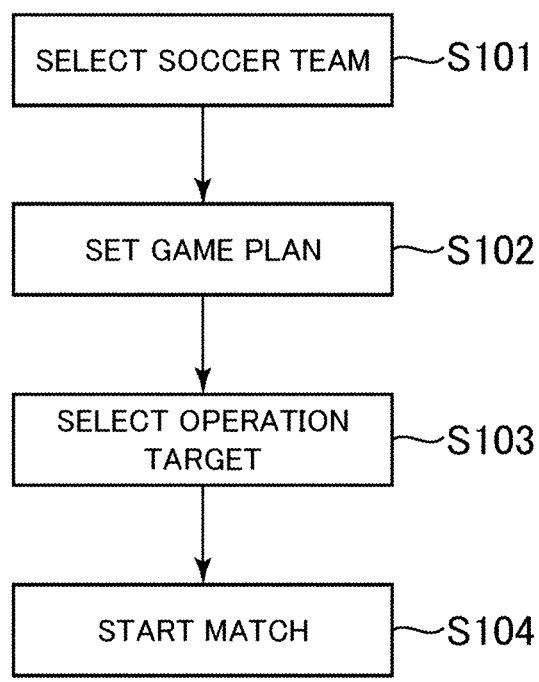
FIG. 4 shows a flow of a soccer game.

FIG. 4 shows one example of a flow of a soccer game. As shown in FIG. 4, initially, the users U1 to U4 select a soccer team (the soccer team A) to operate from among a plurality of soccer teams available (S101). Specifically, for example, a leader user selected from among the users U1 to U4 selects a soccer team while chatting with the other users.

After the selection of the soccer team, the users U1 to U4 set a game plan or the like for their soccer team (S102). Specifically, for example, the leader user selected from among the users U1 to U4 sets a strategy or the like while chatting with the other users.

More specifically, a game plan for the soccer team is set. For example, at least one of the plurality of prepared game plans is selected. For example, "counter attack", "side attack", "central breakthrough" and the like, are available for selection as a game plan, though selectable game plans are not limited to those mentioned above.

Further, a formation for the soccer team is set. For example, any of the plurality of prepared formations is selected, and accordingly, allocation of a forward (FW), a midfielder (MF), and a defender (DF) is determined.

Still further, a player character to participate in a match is selected. That is, a player character to be assigned to each position in the formation is selected. For example, supposing that eighteen player characters belong to a soccer team, eleven player characters are selected from among the eighteen player characters.

After the setting of a game plan or the like, each of the users U1 to U4 selects one player character from among the player characters to participate in a match as their operation target (S103). Each user can operate only the player character selected as their operation target in a match.

After the selection of an operation target, a match begins (S104). That is, a match is played between the soccer team A cooperatively operated by the users U1 to U4 and the soccer team B operated by a computer.

Figure 5:
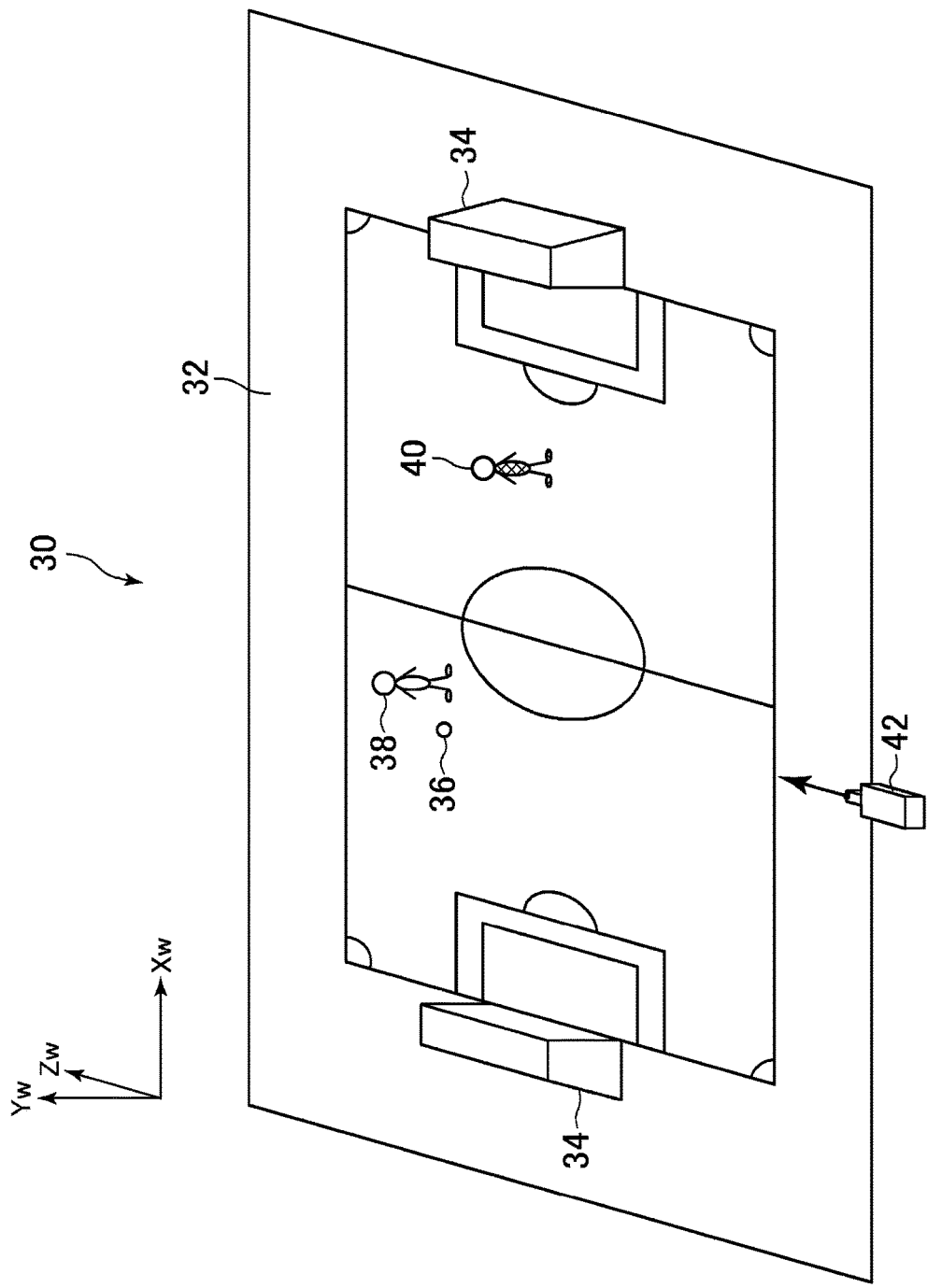
FIG. 5 shows one example of a game space.

In this case, a game space that is common to the users U1 to U4 is generated. FIG. 5 shows one example of the game space. The game space 30 shown in FIG. 5 is a virtual 3D space with three mutually orthogonal coordinate axes Xw, Yw, Zw set thereto.

A field 32, or an object representing a soccer field, is placed in the game space 30, and a goal 34, or an object representing a soccer goal, is placed in the field 32. Further, a ball 36, or an object representing a soccer ball, is also placed in the game space 30. One of the goals 34 is associated with the soccer team A, while the other with the soccer team B. When the ball 36 has moved into the goal 34 associated with either one of the soccer teams, a goal event occurs to the other soccer team.

Further, a player character 38, or an object representing a soccer player belonging to the soccer team A, and a player character 40, or an object representing a soccer player belonging to the soccer team B, are placed in the game space 30. Though not shown in FIG. 5, eleven player characters 38 belonging to the soccer team A and another eleven player characters 40 belonging to the soccer team B are placed in the game space 30.

Of the player characters 38 belonging to the soccer team A, a player character 38 that is set as an operation target of the user U1 acts according to an operation by the user U1. Similarly, a player character 38 that is set as an operation target of the user U2 acts according to an operation by the user U2. This is the same with the users U3, U4. Player characters 38, 40 that are set as operation targets of no user act according to an AI (artificial intelligence).

A virtual camera 42 (a viewpoint) is set in the game space 30. A game screen representing the game space 30 viewed from the virtual camera 42 is displayed on the respective display units 26 of the communication terminals U1 to U4.

Figures 6, 7:
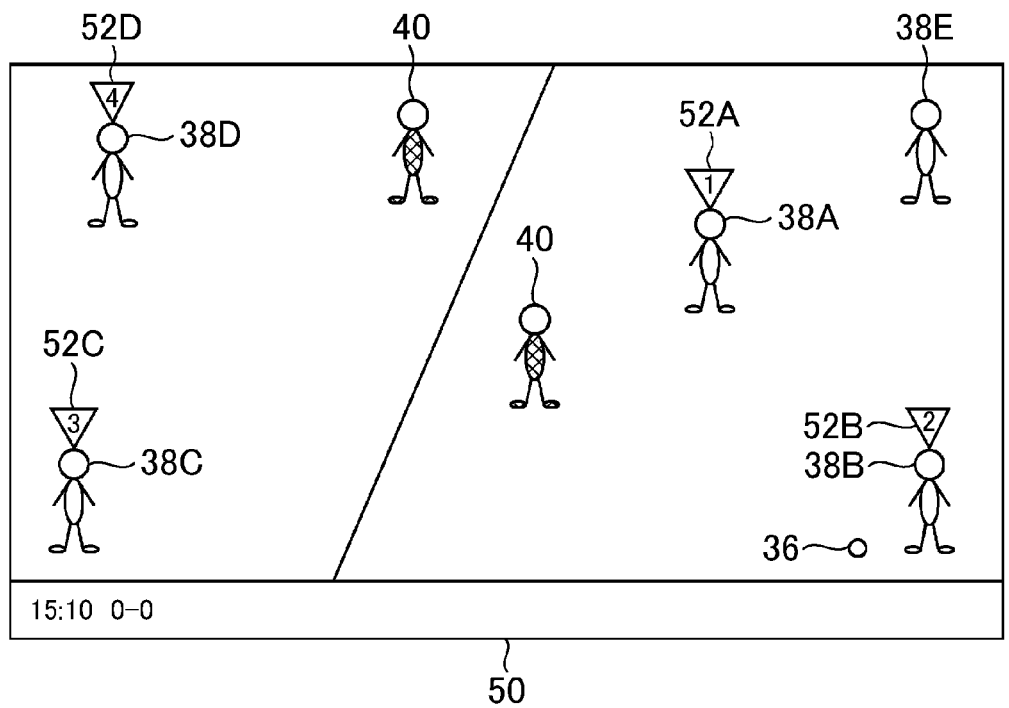
FIG. 6 shows one example of a game screen.
FIG. 7 shows one example of a user table.

FIG. 6 shows one example of the game screen. In the game screen 50 shown in FIG. 6, the ball 36, five player characters 38A, 38B, 38C, 38D, 38E belonging to the soccer team A, and two player characters 40 belonging to the soccer team B are shown.

Further, cursors 52A, 52B, 52C, 52D are shown in the game screen 50. The cursor 52A indicates a player character 38 operated by the user U1; the cursor 52B indicates a player character 38 operated by the user U2; the cursor 52C indicate a player character 38 operated by the user U3; the cursor 52D indicates a player character 38 operated by the user U4.

For example, the virtual camera 42 moves in the game space 30, based on a movement of the ball 36, such that the ball 36 is always shown in the game screen 50. Note that the virtual camera 42 may be set for every user. That is, a virtual camera 42 for the user U1 may be set, based on a movement of the player character 38 operated by the user U1, such that the player character 38A operated by the user U1 is always shown in the game screen 50 in the communication terminal U1. This is the same with the virtual cameras 42 for the users U2, U3, U4.

In the above described soccer game, a poorly trained user who cannot perform a game play expected for the position (role), or a malicious user who does not intend to perform a game play expected the position, may participate in a soccer game. For example, a user participating in a soccer game may keep attacking while neglecting defense, even though the user is operating a defender (DF) player character. Presence of such a user may displease the other users. In a soccer game participated in by many users, in particular, presence of a particular user may displease many other users.

Regarding this point, the game system 1 has a function for preventing many other users from feeling displeased by the presence of the above mentioned user.

Specifically, according to the game system 1, a game play of a user is evaluated based on an evaluation criterion that is set based on a position assigned to the user. For example, whether or not a user is performing a game play expected for the position or whether or not a user is performing a game play not expected for the position is evaluated.

A user with high evaluation gained in a game in the past can participate in a game participated in by many users, but a user with low evaluation gained in a game in the past cannot participate in a game participated in by many users but only in a game participated in by fewer users.

With this function, as a user not performing a game play expected for the position (that is, a user performing a game play not expected for the position) cannot participate in a game participated in by many users, it is possible to reduce the number of users feeling displeased by the presence of such a user.

Figures 8, 9, 10:
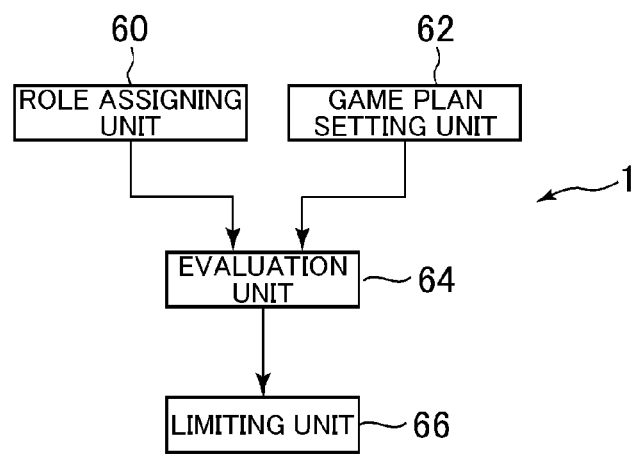
FIG. 8 shows one example of a play history table.
FIG. 9 shows one example of an upper limit participant number level table.
FIG. 10 is a functional block diagram of a game system.

A structure for achieving such a function will be described below. Initially, data stored in the database 15 will be described. FIGS. 7 to 9 show one example of data stored in the database 15.

FIG. 7 shows one example of a user table. A user table shows a list of users utilizing a service provided by the game system 1. The user table includes "user ID", "password", "communication terminal information", "state", and "upper limit participant number level" fields.

The "user ID" field indicates identification information (user ID) for uniquely identifying a user. The "password" field indicates a password specified by a user. The "communication terminal information" field indicates information (for example, an IP address or the like) necessary to communicate with the communication terminal 20 of a user. The "state" field indicates a state of a user. For example, the "state" field indicates whether or not a user is logged in to the game system 1 or requesting to play a game.

The "upper limit participant number level" field indicates the upper limit participant number level of a user. The upper limit participant number level will be described later.

FIG. 8 shows one example of a play history table. The play history table shows play history of a user. Specifically, information on a game in which a user has participated in the past is registered in the play history table. The play history table includes "user ID", "time and date", "participating user", "match result", and "evaluation result" fields.

The "user ID" field is similar to the "user ID" field in the user table. The "time and date" field indicates a time and date when a user participates in a game. The "participating user" field indicates the user IDs of other users participating in a game. The "match result" field indicates a match result (for example, win or lose, a score, or the like).

The "evaluation result" field shows an evaluation result on a game play performed by a user in a game in the past. For example, information indicating whether or not a user has performed a game play expected for the position in a game in the past, whether or not a user has performed a game play not expected for the position in a game in the past, or whether or not a user has accomplished an objective (task) expected for the position in a game in the past is registered in the "evaluation result" field.

In this embodiment, as will be described later, an evaluation value of a user is calculated, based on whether or not the user has performed a game play expected for the position, whether or not the user has performed a game play not expected for the position, or whether or not the user has accomplished an objective (task) expected for the position. This evaluation value is registered in the "evaluation result" field.

For example, a higher evaluation value indicates higher evaluation on a user. That is, a higher evaluation value means a user who performs a game play expected for the position. Meanwhile, a lower evaluation value means a user who performs a game play not expected for the position.

Below, the "upper limit participant number level" will be described. FIG. 9 shows one example of the upper limit participant number level table. The upper limit participant number level table is a table for defining an upper limit participant number level. Note that "E1", "E2", "E3", and "E4" in FIG. 9 indicate respective predetermined values, and have a relationship "E1<E2<E3<E4".

In the upper limit participant number table shown in FIG. 9, the upper limit participant number corresponding to the upper limit participant number level "1" is defined as "two persons". This means that a user at the upper limit participant number level "1" can only participate in a game participated in by two or fewer users, but not a game participated in by three or more users.

In the upper limit participant number table shown in FIG. 9, the upper limit participant number corresponding to the upper limit participant number level "2" is defined as "four persons". This means that a user at the upper limit participant number level "2" can only participate in a game participated in by four or fewer users, but not a game participated in by five or more users. This is similarly applied to the upper limit participant number levels "3", "4", and "5".

In the upper limit participant number table shown in FIG. 9, a higher upper limit participant number level leads to a larger upper limit participant number.

The upper limit participant number level of a user is determined based on an evaluation value of the user gained in a game in the past.

For example, in the upper limit participant number table shown in FIG. 9, an evaluation value-related condition "$0 \leq e < E1$" is correlated to the upper limit participant number level "1". This means that the upper limit participant number level of a user is set to "1" when a statistical value (for example, an average) of the evaluation values gained by the user in a game in the past satisfies "$0 \leq e < E1$".

Further, in the upper limit participant number table shown in FIG. 9, an evaluation value-related condition "$E1 \leq e < E2$" is correlated to the upper limit participant number level "2". This means that the upper limit participant number level of a user is set to "2" when a statistical value (for example, an average) of the evaluation values gained by the user in a game in the past satisfies "$E1 \leq e < E2$". This is similarly applied to the upper limit participant number levels "3", "4", and "5".

In the upper limit participant number table shown in FIG. 9, a larger statistical value (for example, an average) of the evaluation values gained by a user in a game in the past leads to a higher upper limit participant number level.

Note that as a statistical value (for example, an average) of the evaluation values gained by a user in a game in the past, a statistical value of the evaluation values of the user gained in all of the games in the past may be used, or a statistical value of the evaluation values of the user gained in the last N number of games in the past may be used.

A functional block that is implemented in the game system 1 will be described below. FIG. 10 is a functional block diagram showing one example of a functional block that is implemented in the game system 1. As shown in FIG. 10, the game system 1 includes a role assigning unit 60, a game plan setting unit 62, an evaluation unit 64, and a limiting unit 66. These functional blocks are implemented by the control unit 11 of the server 10 or the control unit 21 of the communication terminal 20.

The role assigning unit 60 will be described below. The role assigning unit 60 assigns a role in a game to a user. For example, in the above-described soccer game, the position (FW, MF, DF, or GK) of the player character 38 operated by a user corresponds to a "role in a game".

For example, the role assigning unit 60 assigns a role in a game to a user according to a selection operation by the user. In the above-described soccer game, a user selects their own operation target from among the player character 38 to participate in a match (step S103 in FIG. 4), and the position of the player character 38 selected by the user as their operation target is assigned to the user as a "role".

Note that the role assigning unit 60 may automatically assign a role in a game to a user. For example, the role assigning unit 60 may select an operation target of a user at random (or according to a predetermined rule) from among the player characters 38 to participate in a match. In this case, the position of the automatically selected player character 38 is assigned to a user as a "role".

The game plan setting unit 62 will be described below. The game plan setting unit 62 sets a game plan which a user should follow in a game. For example, in the above-described soccer game, a game plan for the soccer team A corresponds to "a game plan which a user should follow in a game".

For example, the game plan setting unit 62 sets a game plan which a user should follow in a game according to a setting operation by the user. In the above-described soccer game, a user selects a game plan for the soccer team A (step S102 in FIG. 4), and the game plan selected by the user is set as "a game plan which a user should follow".

Note that the game plan setting unit 62 may automatically set a game plan which a user should follow in a game. For example, the game plan setting unit 62 may select a game plan for the soccer team A at random (or according to a predetermined rule). In this case, the automatically selected game plan is set as "a game plan which a user should follow in a game".

The evaluation unit 64 will be described below. The evaluation unit 64 evaluates a game play of a user in a game, based on an evaluation criterion that is set based on a role assigned to the user by the role assigning unit 60.

The evaluation criterion is a criterion for evaluating a game play of a user. As will be described later, an evaluation criterion is set for every role in a game (see FIG. 11). That is, a different evaluation criterion is set for every role in a game.

For example, at least one of the evaluation criteria such as are mentioned below is set as the above-described evaluation criterion.

(1) evaluation criterion on a user operation;
(2) evaluation criterion on a motion or an action of the operation target of a user;
(3) evaluation criterion on progress in accomplishing a task by a user; and
(4) evaluation criterion on a game play which a user should perform or should not perform.

Initially, "an evaluation criterion on a user operation" will be described. When "an evaluation criterion on a user operation" is set, the evaluation unit 64 evaluates a game play of a user in a game, based on an operation made by the user in the game. That is, the evaluation unit 64 determines whether or not an operation made by a user in a game satisfies an evaluation criterion, to thereby evaluate a game play of the user in the game.

Below, "an evaluation criterion on a motion or an action of the operation target of a user" will be described. When "an evaluation criterion on a motion or an action of the operation target of a user" is set, the evaluation unit 64 evaluates a game play of a user in a game, based on a motion or an action performed by the operation target of the user in the game. That is, the evaluation unit 64 determines whether or not a motion or an action performed by the operation target of a user in a game satisfies the evaluation criterion, to thereby evaluate a game play of the user in the game.

In a soccer game, for example, an evaluation criterion on a moving motion (for example, a movement direction or range) of the player character 38 operated by a user is set as the above-described evaluation criterion. In this case, for example, the evaluation unit 64 determines whether or not the player character 38 operated by a user has moved in a predetermined movement direction or within a predetermined movement range, to thereby evaluate a game play of the user.

Alternatively, an evaluation criterion on a motion other than a moving motion of the player character 38 operated by a user (for example, a shoot motion or a pass motion) may be set as the above-described evaluation criterion. Then, the evaluation unit 64 may determine whether or not a pass motion or a shoot motion performed by the player character 38 operated by a user ends in success, to thereby evaluate a game play of the user.

Note that "an evaluation criterion on another object influenced by a motion or an action performed by the operation target of a user" or "an evaluation criterion on influences of a motion or an action performed by the operation target of a user on another object" may be set as "an evaluation criterion on a motion or an action of the operation target of a user".

In a soccer game, for example, "a ball 36 kicked by the player character 38 operated by a user" corresponds to "another object influenced by a motion or an action performed by the operation target of a user". In such a case, an evaluation criterion on a movement direction or range of the ball 36, for example, may be set as the above-described evaluation criterion. Then, the evaluation unit 64 may determine whether or not the movement direction or range of the ball 36 kicked by the player character 38 operated by a user satisfies the evaluation criterion (that is, whether or not the movement direction or range of the ball 36 kicked by the player character 38 operated by a user is appropriate), to thereby evaluate a game play of the user.

Note that in a game, for example, in which the character operated by a user attacks an opponent character (that is, a role playing game, an action game, or the like), an evaluation criterion on an attack target or range for the character operated by the user may be set as the above-described evaluation criterion. Then, the evaluation unit 64 may determine whether or not the attack target or range for the character operated by the user satisfies the evaluation criterion (that is, whether or not the attack target or range for the character operated by the user is appropriate), to thereby evaluate a game play of the user.

Below, "an evaluation criterion on progress in accomplishing a task by a user" will be described. In this case, a "task" is set based on a role assigned to a user by the role assigning unit 60. When such an evaluation criterion is set, the evaluation unit 64 evaluates a game play of a user in a game, based on progress in accomplishing the task by the user. That is, the evaluation unit 64 determines whether or not the progress in accomplishing the task by the user satisfies the evaluation criterion, to thereby evaluate a game play of the user in a game. For example, the evaluation unit 64 determines whether or not the user has accomplished the task. Further, for example, the evaluation unit 64 determines whether or not the progress in accomplishing the task by the user is equal to or higher than a threshold. Then, the evaluation unit 64 evaluates a game play of the user in a game, based on at least one of these determination results.

Note that whether or not a user has accomplished a task can possibly be determined by determining whether or not the user has performed an operation which the user should perform, or whether or not the operation target of the user has performed a motion or an action which the operation target of the user should perform. This is similarly applicable to determination as to whether or not progress in accomplishing a task by a user is equal to or higher than a threshold. In such a case, "an evaluation criterion on progress in accomplishing a task by a user" corresponds to "an evaluation criterion on a user operation" or "an evaluation criterion on a motion or an action of the operation target of a user".

Below, "an evaluation criterion on a game play which a user should perform" and "an evaluation criterion on a game play which a user should not perform" will be described. In this case, "a game play which a user should perform" and "a game play which a user should not perform" are set, based on a role assigned to a user by the role assigning unit 60. When such an evaluation criterion is set, for example, the evaluation unit 64 (the first determination unit) determines whether or not a user has performed a game play which the user should perform. Further, for example, the evaluation unit 64 (the second determination unit) determines whether or not the user has performed a game play which the user should not perform. Then, the evaluation unit 64 evaluates a game play of the user in a game, based on at least one of these determination results.

There are cases in which whether or not a user has performed a game play which the user should perform can be determined by determining whether or not the user has performed an operation which the user should perform, or determining whether or not the operation target of the user has performed a motion or an action which the operation target of the user should perform. In such a case, "an evaluation criterion on a game play which a user should perform" corresponds to "an evaluation criterion on a user operation" or "an evaluation criterion on a motion or an action of the operation target of a user". This is similarly applicable to "an evaluation criterion on a game play which a user should not perform".

In this embodiment, the evaluation unit 64 calculates an evaluation value of each user in a game, based on the evaluation criterion data.

FIG. 11 shows one example of the evaluation criterion data. The evaluation criterion data is stored in a storage device accessible by the evaluation unit 64. That is, when the evaluation unit 64 is implemented by the control unit 21 of the communication terminal 20, the evaluation criterion data is stored in a storage device (for example, the storage unit 22) accessible by the control unit 21. Meanwhile, when the evaluation unit 64 is implemented by the control unit 11 of the server 10, the evaluation criterion data is stored in a storage device (for example, the storage unit 12 or the database 15) accessible by the control unit 11.

In the evaluation criterion data shown in FIG. 11, an evaluation criterion is set for every position (role). That is, a different evaluation criterion is set for every position. Specifically, (a) a type of game play which a user should perform, (b) a type of game play which a user should not perform, or (c) an objective (task) which a user should accomplish, are set for every position.

In FIG. 11, an "addition/subtraction classification" indicates whether it is an addition target or a subtraction target, and "value" indicates a value to be added to or subtracted from the evaluation value of a user. For example, for a type of game play which a user should perform, "addition" is set for the addition/subtraction classification. Similarly, for an objective which a user should accomplish, "addition" is set for the addition/subtraction classification. Meanwhile, for a type of game play which a user should not perform, "subtraction" is set for the addition/subtraction classification.

For a position "FW", for example, a type of action which a forward (FW) player character 38 should perform is defined as a "type of game play which a user should perform". In the example shown in FIG. 11, "to shoot" corresponds to "a type of action which a forward (FW) player 38 should perform".

Further, for a position "FW", an objective which a forward (FW) player character 38 should accomplish is defined as "an objective which a user should accomplish". In the example shown in FIG. 11, "to score" corresponds to "an objective which a forward (FW) player character 38 should accomplish".

For a position "FW", a type of action which a forward (FW) player character 38 should not perform is defined as a "type of game play which a user should not perform". In the example shown in FIG. 11, "positioned in its own area when a teammate player holds the ball in an opponent area" corresponds to "a type of action which a forward (FW) player character 38 should not perform".

Further, for a position "DF", for example, a type of action which a defender (DF) player character 38 should perform is defined as a "type of game play which a user should perform". Further, an objective which a defender (DF) player character 38 should accomplish is defined as "an objective which a user should accomplish". In the example shown in FIG. 11, "to take the ball from an opponent team player" corresponds to a "type of action which a defender (DF) player character 38 should perform" or "an objective which a defender (DF) player character 38 should accomplish".

Further, for a position "DF", a type of action which a defender (DF) player character 38 should not perform is defined as a "type of game play which a user should not perform". In the example shown in FIG. 11, "positioned in an opponent area when an opponent team player holds the ball in their own area" corresponds to "a type of action which a defender (DF) player character 38 should not perform".

In this embodiment, for example, an evaluation value table such as is shown in FIG. 12 is stored. The evaluation value table is data showing an evaluation value of each player playing a game. The evaluation value table is stored in a storage device accessible by the evaluation unit 64.

For example, when the user U1 is operating a forward (FW) player character 38, the evaluation unit 64 updates the evaluation value of the user U1, based on an evaluation criterion correlated to the position "FW". For example, when the player character 38 operated by the user U1 shoots, a value corresponding to "to shoot" is added to the evaluation value of the user U1.

Meanwhile, when the user U2 is operating a defender (DF) player character 38, the evaluation unit 64 updates the evaluation value of the user U2, based on an evaluation criterion correlated to the position "DF". For example, when the player character 38 operated by the user U2 is positioned in the opponent area while an opponent player character 40 is holding the ball 36 in the area of the team of the player character 38 operated by the user U2, a value corresponding to "positioned in opponent area while opponent team player holds ball in its own area" is subtracted from the evaluation value of the user U2.

Note that the evaluation unit 64 may evaluate a game play of a user in a game, based on an evaluation criterion that is set based on a role assigned to the user by the role assigning unit 60 and a game plan set by the game plan setting unit 62.

FIG. 13 shows one example of an evaluation criterion in this case. In the evaluation criterion data shown in FIG. 13, an evaluation criterion is set with respect to a combination of a position (role) and a game plan. Specifically, (a) a type of game play which a user should perform, (b) a type of game play which a user should not perform, and (c) an objective (task) which a user should accomplish, are set for every combination of a position and a game plan. That is, as an evaluation criterion for a role is defined for every game plan, it is possible to set a different evaluation criterion for one or more roles for every game plan.

For example, for a combination of a position "FW" and a game plan "counter attack", a type of action which a forward (FW) player character 38 should perform in order to achieve counter attack is defined as "a type of game play which a user should perform", and a type of action which a forward (FW) player character 38 should not perform in order to achieve counter attack is defined as "a type of game play which a user should not perform".

Similarly, for a combination of a position "DF" and a game plan "counter attack", a type of action which a defender (DF) player character 38 should perform in order to achieve counter attack is set as "a type of game play which a user should perform", and a type of action which a defender (DF) player character 38 should not perform in order to achieve counter attack is set as "a type of game play which a user should not perform".

For example, when a game plan for the soccer team. A operated by the users U1 to U4 is "counter attack" and the position of the player character 38 operated by the user U1 is a forward (FW), the evaluation unit 64 updates the evaluation value of the user U1, based on the evaluation criterion correlated to the combination of the position "FW" and the game plan "counter attack".

Further, for example, when the game plan for the soccer team A operated by the users U1 to U4 is "counter attack" and the position of the player character 38 operated by the user U2 is a defender (DF), the evaluation unit 64 updates the evaluation value of the user U2, based on the evaluation criterion correlated to the combination of the position "DF" and the game plan "counter attack".

According to the evaluation criterion data such as is shown in FIG. 13, as an evaluation criterion for evaluating a game play of a user (for example, a type of game play which a user should perform, a type of game play which a user should not perform, or an objective which a user should accomplish) differs for every game plan, it is possible to encourage a user to perform a game play in consideration of a role in the game plan.

According to the evaluation criterion data such as is shown in FIG. 13, it is possible to improve game strategy as will be described below.

That is, there is a case in which an opponent can find out a role assigned to a user by the role assigning unit 60. In the above-described soccer game, for example, the opponent can find out a position (a role) of the player character 38 operated by the user.

However, an opponent cannot find out a game plan set by the game plan setting unit 62 as the game plan is not disclosed to the opponent. In the above-described soccer game, for example, a game plan for the soccer team A is shared by the users U1, U2, U3, U4 operating the soccer team A, but not disclosed to the opponent. Therefore, an opponent cannot know the game plan of the soccer team A.

Regarding the above, according to the evaluation criterion data such as is shown in FIG. 13, "a type of game play which a user should perform", "a type of game play which a user should not perform", or "an objective which a user should accomplish" can be set differently for every game plan, as described above, and a game plan for the user side is not disclosed to the opponent. This makes it possible for a user to outwit an opponent, as the opponent cannot find out "a type of game play which a user should perform", "a type of game play which a user should not perform", or "an objective which a user should accomplish" even though the opponent can find out to some extent a role assigned to the user. As described above, according to the evaluation criterion data such as is shown in FIG. 13, it is possible to improve game strategy.

Note that according to the evaluation criterion data shown in FIG. 13, a different type of play or a different objective may be set for every game plan, or the same type of play or the same objective may be set for different game plans. In the latter case, the same type of game play or an addition/subtraction classification and a value may be set differently for every game plan. That is, a type of play that is an addition target in one game plan may be a subtraction target in another game plan. Further, a type of play having a high value in one game plan may have a low value in another game plan. In this manner, a weight (importance) of "a type of game play which a user should perform", "a type of game play which a user should not perform", or "an objective which a user should accomplish" may be set differently for every game plan. That is, a weight (importance) of an evaluation criterion for each role may be set differently for every game plan.

When a game ends, evaluation values of the respective users participating in the game are registered in the play history table together with the match result or the like, and the upper limit participant number level of each user participating in the game is updated. For example, the average of the evaluation values of a user gained in all games in the past or N number of games in the past is newly calculated, and the upper limit participant number level registered in the user table is updated based on the average and the upper limit participant number level table.

The limiting unit 66 will be described below. Based on an evaluation result by the evaluation unit 64 on a game play of a user in the past, the limiting unit 66 limits the number of other users who can participate in a game in which the user participates.

For example, the limiting unit 66 determines a reference participant number, based on an evaluation result by the evaluation unit 64 on a game play of a user in the past, and then restricts the user from participating in a game participated in by a larger number of other users than the reference participant number. In other words, the limiting unit 66 restricts a larger number of other users than the reference participant number from participating in a game in which the user participates.

In this embodiment, an evaluation value registered in the "evaluation result" field in the play history table corresponds to "an evaluation result by the evaluation unit 64 on a game play of a user in the past". Note that as the upper limit participant number level registered in the "upper limit participant number level" field in the user table is determined based on an evaluation result by the evaluation unit 64 on a game play of a user in the past, as described above, the upper limit participant number level also corresponds to "an evaluation result by the evaluation unit 64 on a game play of a user in the past".

For example, when the user U1 is requesting to play a game, the limiting unit 66 accesses the user table to obtain the upper limit participant number level of the user U1. As described above, the upper limit participant number level of the user U1 is determined based on an evaluation result (a statistical value of evaluation values) of the user U1 gained in a game in the past.

Then, for example, when the upper limit participant number level of the user U1 is "2", the limiting unit 66 determines the upper limit participant number for the user U1 as "four persons". In this case, the user U1 cannot participate in a game in which five or more users participate, but only a game in which four or fewer users participate. That is, the number of other users (a reference participant number) who can participate in a game in which the user U1 participates is three, and the user U1 cannot participate in a game participated in by three (a reference participant number) or more other users.

Processing that is executed in the game system 1 to implement the above described functional block will be described below.

Figure 14:
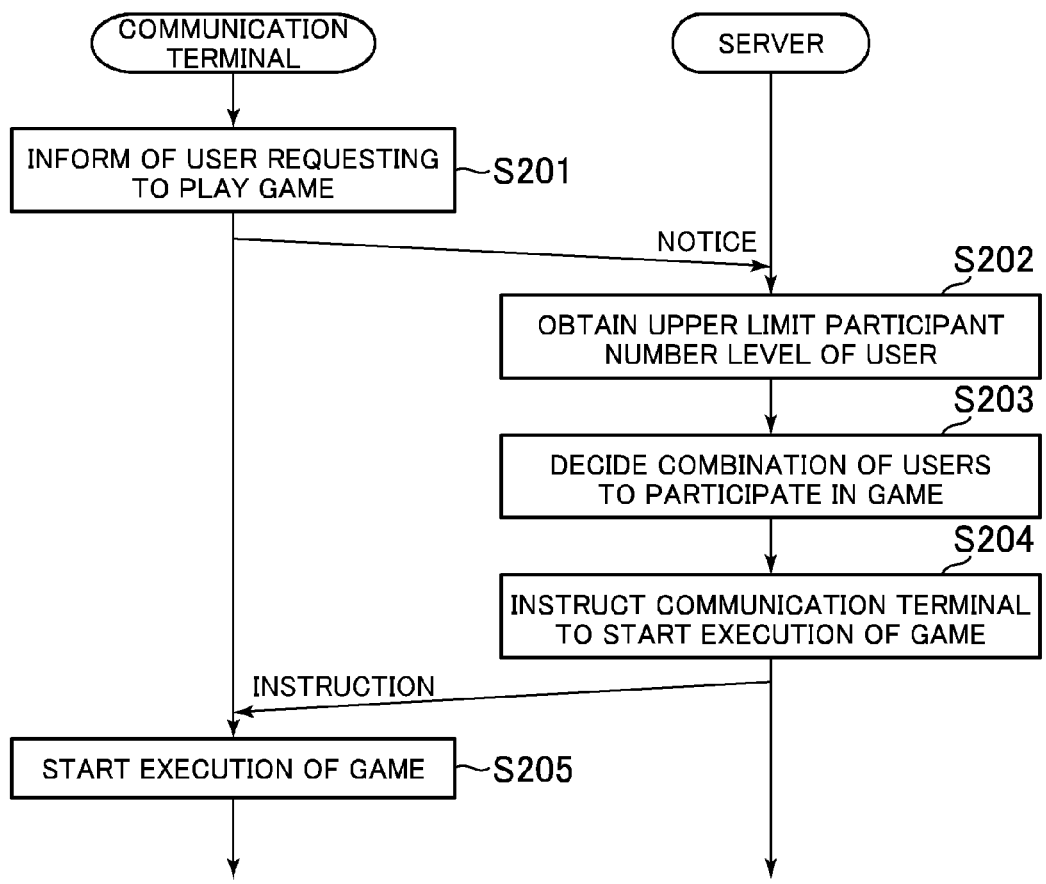
FIG. 14 shows one example of processing that is executed in a game system.

FIG. 14 is a flowchart showing one example of processing that is executed when a user requests to play a game. The control unit 11 of the server 10 executes the processing shown in FIG. 14 according to a program, thereby functions as the limiting unit 66.

As shown in FIG. 14, initially, the control unit 21 of the communication terminal 20 notifies the server 10 of a user requesting to play a game (S201).

When the server 10 receives the notice, the control unit 11 of the server 10 obtains the upper limit participant number level of the user from the user table (S202). Then, the control unit 11 (the limiting unit 66) decides a combination of users to participate in the game (that is, a combination of players to play the game together) (S203).

Step S203 will be described below. Assume here a situation, for example, in which the users U1 to U8, such as are shown in FIG. 15, are requesting to play a game.

As shown in FIG. 15 (or FIG. 9), for example, as the upper limit participant number corresponding to the upper limit participant number level "1" is defined as "two persons", the control unit 11 selects two users from among the users at the upper limit participant number level "1". In the situation shown in FIG. 15, there are two users at the upper limit participant number level "1" (U5, U6). In this case, the control unit 11 selects these two users to determine these two users as "a combination of users to participate in a game".

Further, as shown in FIG. 15 (or FIG. 9), for example, as the upper limit participant number corresponding to the upper limit participant number level "2" is defined as "four persons", the control unit 11 selects four users from among the users at the upper limit participant number level "2". In the situation shown in FIG. 15, there are four users at the upper limit participant number level "2" (U1, U2, U3, U4). In this case, the control unit 11 selects these four users to determine these four users as "a combination of users to participate in a game".

Note that if there are only three users at the upper limit participant number level "2", the control unit 11 determines the three users as "a combination of users to participate in a game". Alternatively, the control unit 11 selects one user from among users at an upper limit participant number level higher than "2", and determines the four users including the one user and the above mentioned three users as "a combination of users to participate in a game".

In a case where a combination of users to participate in a game is decided, the control unit 11 instructs the respective communication terminals 20 of the users included in the combination to start execution of the game (S204).

When a soccer game is executed in a peer-to-peer method, for example, the control unit 11 sends the information mentioned below to the communication terminal 20 of each user.

(A1) information for instructing execution of a game in a peer-to-peer method;
(A2) information indicating a communication terminal 20 to function as a game server; and
(A3) information (an IP address or the like) necessary for data communication with another communication terminal 20.

For example, when the users U1 to U4 are determined as "a combination of users to participate in a game", the control unit 11 selects any of the communication terminals U1 to U4 as a communication terminal 20 to function as a game server. The control unit 11 then sends the above mentioned information to the communication terminals U1 to U4.

In this case, after sending the information to the communication terminals U1 to U4, data communication begins between the communication terminals U1 to U4, and execution of a soccer game participated in by the users U1 to U4 begins (S205). Specifically, after execution of the procedure shown in FIG. 4, for example, a match begins between the soccer team A cooperatively operated by the users U1 to U4 and the soccer team B operated by a computer.

Figure 16:
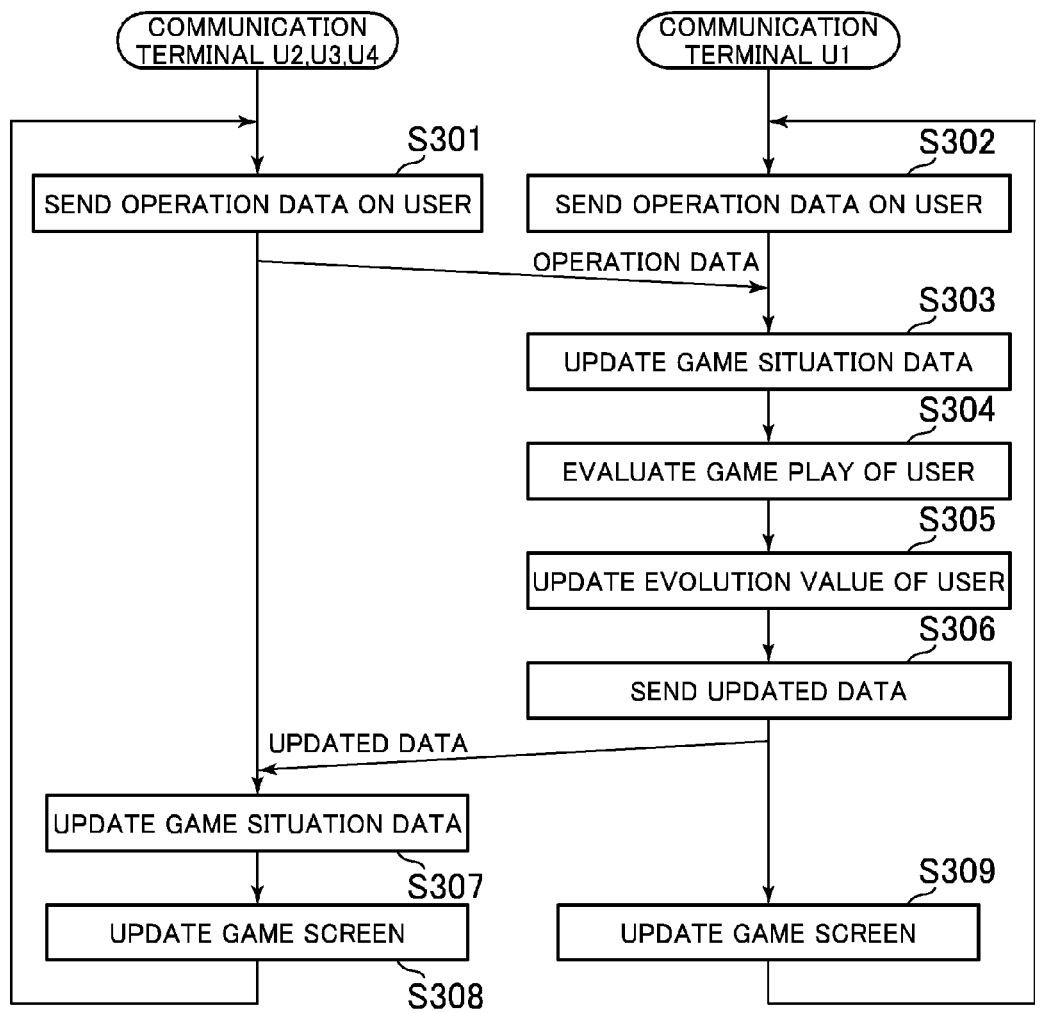
FIG. 16 shows one example of processing that is executed in a game system.

FIG. 16 shows one example of processing that is executed when a match is played in a peer-to-peer method between the soccer team A cooperatively operated by the users U1 to U4 and the soccer team B operated by a computer.

Note that when a peer-to-peer method is employed, any of the communication terminals U1 to U4 functions as a game server. Assume here that the communication terminal U1 functions as a game server. In this case, game situation data describing the latest game situation is stored in the storage unit 22 of the communication terminal U1, and a copy of the game situation data is stored in the respective storage units 22 of the communication terminals U2, U3, U4. Note that the game situation data includes data indicating the current states (positions or the like) of the ball 36, the player characters 38, 40, and the virtual camera 42 placed in the game space 30, and data indicating a score obtained thus far and a period of time elapsed until the current moment, or the like.

When the communication terminal U1 functions as a game server, the control unit 21 of the communication terminal U2 sends operation data on a game operation performed by the user U2 of the communication terminal U2 to the communication terminal U1 (S301). Similar processing is executed in the communication terminals U3, U4 as well.

Meanwhile, the control unit 21 of the communication terminal U1 obtains operation data on a game operation performed by the user U1 (S302), and updates the game situation data stored in the storage unit 22 of the communication terminal U1, based on the operation data obtained at step S302 and the operation data received from the respective communication terminals U2, U3, U4 (S303).

The control unit 21 (the evaluation unit 64) of the communication terminal U1 then evaluates respective game plays of the users U1 to U4 (S304).

That is, referring to the evaluation criterion data, the control unit 21 obtains an evaluation criterion correlated to a combination of the position of the player character 38 operated by a user and a game plan for the soccer team A. The control unit 21 then evaluates a game play of the user, based on the evaluation criterion. For example, the control unit 21 determines whether or not the user has performed a game play which the user should perform. Alternatively, the control unit 21 determines whether or not the user has performed a game play which the user should not perform. Still alternatively, the control unit 21 determines whether or not the user has accomplished an objective (task) which the user should accomplish.

The control unit 21 then updates the evaluation value of the user stored in the evaluation value table, based on the evaluation result obtained at step S304 and the evaluation criterion data (S305).

For example, when it is determined at step S304 that the user has performed an addition target game play (that is, a game play which a user should perform), a value corresponding to the game play is added to the evaluation value of the user. Further, for example, when it is determined at step S304 that the user has performed a subtraction target game play (that is, a game play which a user should not perform), a value corresponding to the game play is subtracted from the evaluation value of the user. Further, for example, when it is determined at S304 that the user has accomplished an addition target objective (that is, an objective which a user should accomplish), a value corresponding to the objective is added to the evaluation value of the user.

Thereafter, the control unit 21 of the communication terminal U1 sends the updated data to the communication terminals U2 to U4 to inform the communication terminals U2 to U4 of the updated content of the game situation data (S306).

In this case, the control unit 21 of the communication terminal U2 updates the game situation data stored in the storage unit 22 of the communication terminal U2, based on the updated data received from the communication terminal U1 (S308). Then, in the communication terminal U2, the game screen 50 is updated based on the game situation data stored in the storage unit 22 of the communication terminal U2 (S308). Processing similar to the above is executed in the communication terminals U3, U4.

Similarly, in the communication terminal U1, the game screen 50 is updated based on the game situation data stored in the storage unit 22 of the communication terminal U1 (S309).

Note that although updated data for informing the communication terminals U2 to U4 of the updated content of the game situation data is sent from the communication terminal U1 to the communication terminals U2 to U4 in the example shown in FIG. 16, screen data describing a game screen 50 to be displayed in the respective communication terminals U2 to U4 may be sent from the communication terminal U1 to the communication terminals U2 to U4, so that the game screen 50 may be updated in the communication terminals U2 to U4, based on the screen data received from the communication terminal U1.

When a game being executed in a peer-to-peer method ends, the communication terminal U1 functioning as a game server sends the information mentioned below to the server 10.

(B1) information informing of normal ending of the game;
(B2) information showing a result of game (match result); and
(B3) evaluation value data.

When the server 10 receives the above mentioned information, the control unit 11 of the server 10 updates the play history table, based on the above mentioned information. Further, the control unit 11 of the server 10 updates the respective upper limit participant number levels of the users U1 to U4 participating in the game.

Note that when a soccer game is executed in a method such as is described above, the limiting unit 66, among the functional blocks shown in FIG. 10, is implemented by the server 10, and the functional blocks other than the limiting unit 66 are implemented by the communication terminal 20 functioning as a game server.

Note that the processing that is executed when a game participated in by the users U1 to U4 is executed in a peer-to-peer method is not limited to the example shown in FIG. 16.

That is, although any of the communication terminals U1 to U4 function as a game server in the example shown in FIG. 16, the communication terminals U1 to U4 may equally exchange operation data between one another.

That is, the control unit 21 of the communication terminal U1 obtains operation data on a game operation performed by the user U1, and sends the operation data to the other communication terminals U2 to U4. Similar processing is executed in the communication terminals U2 to U4 as well.

In this case, the communication terminal U1 updates the game situation data stored in the storage unit 22 of the communication terminal U1, based on the operation data on each of the users U1 to U4. Then, the control unit 21 (the evaluation unit 64) of the communication terminal U1 evaluates a game play of the user U1, and updates the evaluation value of the user U1, based on the evaluation result. Thereafter, the communication terminal U1 updates the game screen 50 displayed on the display unit 26 of the communication terminal U1, based on the game situation data stored in the storage unit 22 of the communication terminal U1. Similar processing is executed in the communication terminals U2 to U4 as well.

When a game participated in by the users U1 to U4 duly ends, the game devices U1 to U4 send the above mentioned information B1 to B3 to the server 10.

Note that when a soccer game is executed in a method such as is described above, the limiting unit 66, among the functional blocks shown in FIG. 10, is implemented by the server 10, while the functional blocks other than the limiting unit 66 are implemented by the respective communication terminals 20.

Note that while a case in which a soccer game participated in by the users U1 to U4 is executed in a peer-to-peer method is described in the above, processing that is executed when a soccer game participated in by the users U1 to U4 is performed in a client-server method will be described below. In this case, the server 10 or a server computer different from the server 10 functions as a game server. The description below is based on an assumption that the server 10 functions as a game server.

Figure 17:
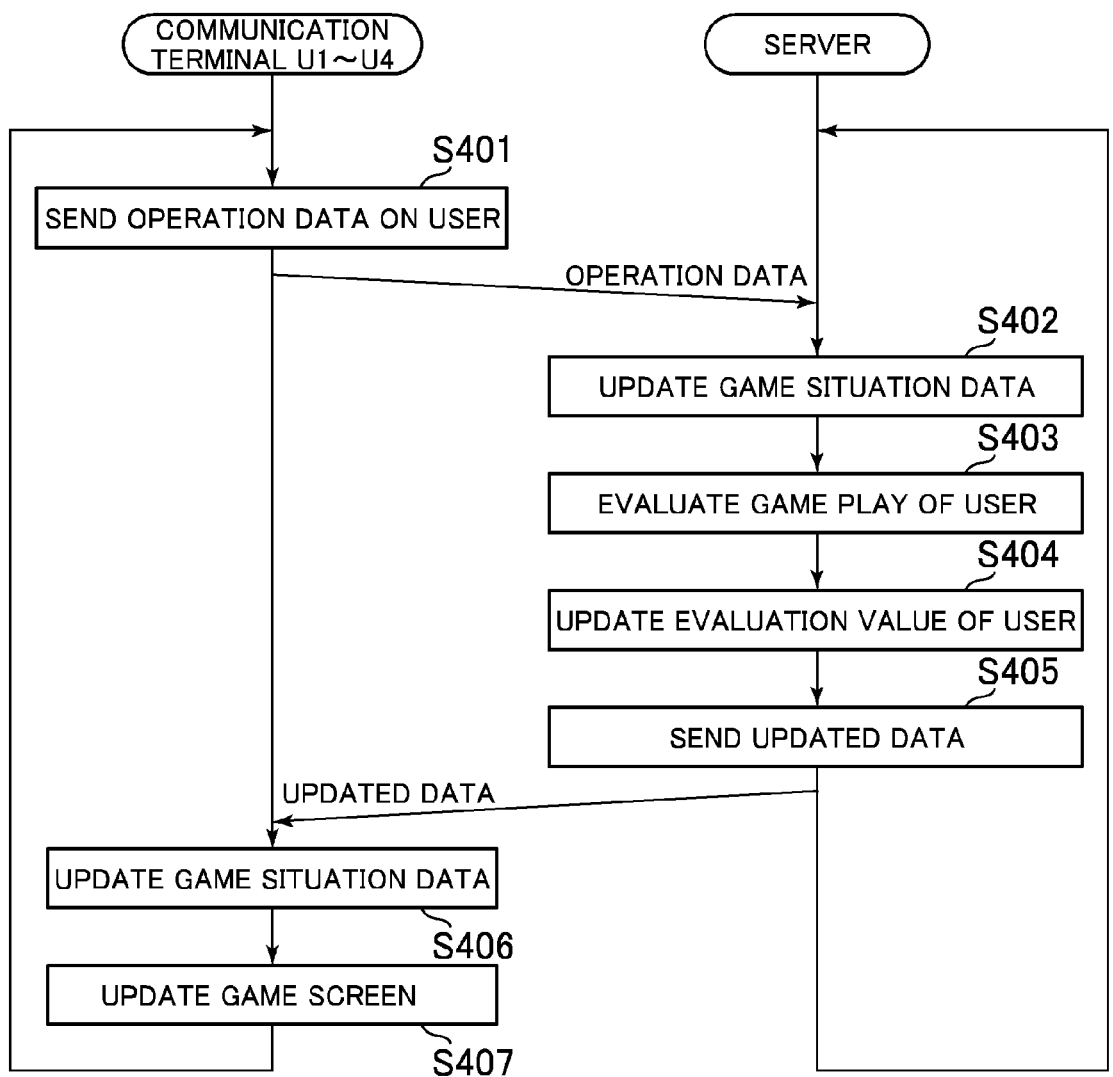
FIG. 17 shows another example of processing that is executed in a game system.

FIG. 17 shows one example of processing that is executed when a match of a soccer game participated in by the users U1 to U4 is executed in a client/server method. When a client/server method is employed, game situation data describing the latest game situation is stored in the storage unit 12 of the server 10 (or the database 15), and a copy of the game situation data is stored in the respective storage units 22 of the communication terminals U1 to U4.

When a client/server method is employed, the communication terminal U1 sends operation data on a game operation performed by the user U1 to the server 10 (S401). Similar processing is executed in the communication terminals U2 to U4 as well.

The control unit 11 of the server 10 updates the game situation data stored in the server 10, based on the operation data received from the respective communication terminals U1 to U4 (S402). Further, the control unit 11 (the evaluation unit 64) evaluates respective game plays of the users U1 to U4 (S403), and updates the respective evaluation values of the users U1 to U4, based on the respective evaluation results (S404). This processing is similar to that at steps S304, S305 in FIG. 16.

Further, the control unit 11 sends updated data for informing of the updated content of the game situation data to the communication terminals U1 to U4 (S405). In this case, the communication terminal U1 updates the game situation data stored in the communication terminal U1, based on the updated data received from the server 10 (S406), and updates the game screen 50 displayed on the display unit 26 of the communication terminal U1, based on the updated game situation data (S407). Similar processing is executed in the game devices U2 to U4.

Note that although updated data for informing the communication terminals U1 to U4 of the updated content of the game situation data is sent by the server 10 to the communication terminals U1 to U4 in the example shown in FIG. 17, screen data describing a game screen 50 to be displayed in the communication terminals U1 to U4 may be sent by the server 10 to the communication terminals U1 to U4, so that the communication terminals U1 to U4 may update the game screen 50, based on the screen data received from the server 10. In this case, it is unnecessary to store a copy of the game situation data in the respective storage units 22 of the communication terminals U1 to U4.

When a soccer game match being executed in a client/server method duly ends, the control unit 11 of the server 10 updates the play history table. Further, the control unit 11 of the server 10 updates the respective upper limit participant number levels of the users U1 to U4 participating in the game.

Note that when a soccer game is executed in the above described method and the server 10 functions as a game server, all of the functional blocks shown in FIG. 10 are implemented in the server 10 (the game control device). Meanwhile, when a server computer other than the server 10 functions as a game server, the limiting unit 66, among the functional blocks shown in FIG. 10, is implemented in the server 10, and the functional blocks other than the limiting unit 66 are implemented in the server computer other than the server 10.

Note that processing that is executed when a game participated in by the users U1 to U4 is executed in a client/server method is not limited to the example shown in FIG. 17.

For example, execution of the processing at step S402 to S405 may be shared by a plurality of server computers. For example, the server 10 may execute steps S402, S405, while the other server computer may execute steps S403, S404.

Further, for example, the server 10 may send the operation data on all of the communication terminals U1 to U4 to the respective communication terminals U1 to U4, so that the respective communication terminals 20 execute the processing at steps S402 to S404 shown in FIG. 17. Alternatively, only step S402 among steps S402 to S404 may be executed in the respective communication terminals 20, while processing for evaluation on a user (S403, S404) may be executed in the server 10 (or a server computer other than the server 10). This makes it possible to improve secrecy in communication, compared to a case in which a peer-to-peer method, in which operation data is exchanged between the communication terminals 20, is employed. Note that in this structure, the communication terminal corresponds a game control device having functional blocks according to the present invention.

According to the game system 1 described above, whether or not a user has performed a game play expected for a role assigned to the user is determined. Alternatively, whether or not a user has performed a game play not expected for a role assigned to the user is determined. Still alternatively, whether or not a user has accomplished an objective (task) expected for a role assigned to the user is determined. A game play of the user is evaluated based on at least one of these determination results.

Then, the upper limit participant number of a game in which a user participates is limited, based on the evaluation result on the user obtained in a game in the past. That is, for example, the upper limit participant number for a user with a lower evaluation is set to a smaller number, so that the user with a lower evaluation can only participate in a game participated in by a smaller number of users, but not a game participated in by a larger number of users.

According to the game system 1, for a poorly trained user who cannot perform a game play expected for the role or a malicious user who does not intend to perform a game play expected for the role, for example, the upper limit participant number is set to a smaller number, so that such players cannot participate in a game participated in by many users. This makes it possible to prevent many other users from feeling displeased by the presence of such a user.

Note that according to the game system 1, a poorly trained user who cannot perform a game play expected for the role can train themselves in a game participated in by a small number of users so as to become able to perform a game play expected for the role. Then, when a player becomes able to perform a game play expected for a role as their training level increases, their evaluation accordingly increases so that the user can participate in a game participated in by many users.

Note that the present invention is not limited to the above-described embodiment.

[1] Although the server 10 decides a combination of users to participate in a game in the above, each user may select a combination of users to participate in a game.

For example, a user can create a so-called match room and enter a match room created by another user. With the above, a user may be able to select to some extent a combination of users to participate in a game, based on entry to and exit from a match room.

Figure 18:
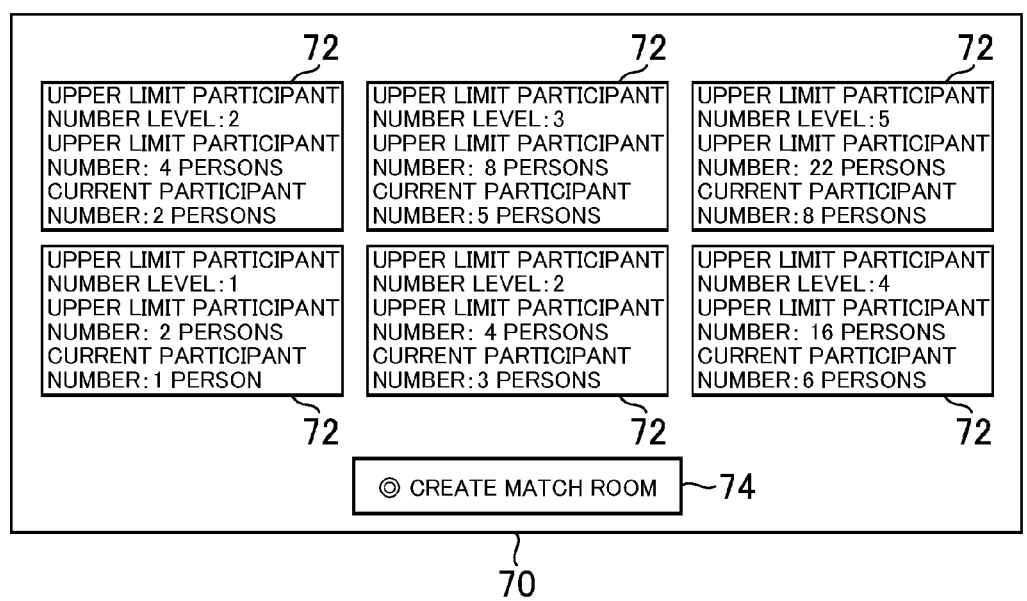
FIG. 18 shows one example of a match room screen.

FIG. 18 shows one example of a match room screen. The match room screen 70 shown in FIG. 18 shows a plurality of match rooms 72, an upper limit participant number level is set with each match room 72.

For example, the upper limit participant number level of a match room 72 may be set to the upper limit participant number level of a user who has created the match room 72. For example, the upper limit participant number level of a match room 72 created by a user at the upper limit participant number level "2" may be set to "2". Alternatively, the upper limit participant number level of a user having the lowest upper limit participant number level among those in the match room 72 may be set as the upper limit participant number level of that match room 72.

For example, a user may not be able to enter a match room 72 having an upper limit participant number level higher than their own upper limit participant number level. That is, a user may be able to enter a match room 72 having an upper limit participant number level equal to or lower than their own upper limit participant number level.

In this case, the server 10 may determine whether or not a user can enter the match room 72, or the communication terminal 20 may determine whether or not a user can enter the match room 72. In the latter case, the communication terminal 20 obtains the upper limit participant number level of a user from the server 10, and compares the upper limit participant number level of the user and the upper limit participant number level of the match room 72 to determine whether or not the user can enter the match room 72.

In the former case, the limiting unit 66 is implemented by the server 10 (the game control device), while in the latter case, the limiting unit 66 is implemented by the communication terminal (a game control device). As described above, when a game is executed in a peer-to-peer method, the role assigning unit 60, the game plan setting unit 62, and the evaluation unit 64 are implemented by the communication terminal 20. Therefore, in the latter case, all of the functional blocks shown in FIG. 10 are implemented by the communication terminal 20 (the game control device).

Further, only a match room 72 into which a user can enter may be shown in the match room screen 70, but a match room 72 into which the user cannot enter may not be shown. That is, only a match room 72 having an upper limit participant number level equal to or lower than that of a user may be shown in the match room screen 70, and a match room 72 having an upper limit participant number level higher than that of the user may not be shown.

That is, upon request by the communication terminal 20 for screen data on the match room screen 70, the server 10 may read the upper limit participant number level of the user of the communication terminal 20 from the user table, and send to the communication terminal 20 screen data on the match room screen 70 showing only a match room 72 having an upper limit participant number level equal to or lower than the upper limit participant number level. In this case, the upper limit participant number level of each match room 72 may be stored in the database 15 or the storage unit 12.

The match room screen 70 also shows a create button 74 for creating a match room 72. When a user selects the create button 74, a match room 72 is newly created. In this case, the upper limit participant number level of the user is set as the upper limit participant number level of the newly created match room 72.

A user creating a match room 72 may optionally set an upper limit participant number level equal to or lower than their upper limit participant number level as the upper limit participant number level of the match room 72. For example, when a user at the upper limit participant number level "3" creates a match room 72, any of "1" to "3" may be optionally set as the upper limit participant number level of the match room 72.

A user creating a match room 72 may optionally set correspondence between the upper limit participant number level and the upper limit participant number. That is, correspondence between the upper limit participant number level and the upper limit participant number may be determined for every match room 72, rather than being fixed as shown in FIG. 9. For example, by setting the upper limit participant number corresponding to the upper limit participant number level "2" to "twenty-two persons", it is possible to create a match room 72 allowing participation by twenty-two users at the upper limit participant number level "2" or higher.

[2] In addition to an evaluation criterion for evaluating whether or not a user is performing a game play expected for the role, an evaluation criterion for evaluating whether or not a user is performing a game play in cooperation with another user may be set. In other words, an evaluation criterion for evaluating whether or not a user is performing a game play while being conscious of cooperation with other users may be set. Further, an evaluation criterion for evaluating whether or not a user gives a suitable instruction as a leader to another user may be set.

[3] An evaluation result of a user gained in a game in the past may be stored for every role. That is, a position (role) that is assigned to a user in a game in the past may also be recorded in the play history table.

Then, a player character 38 that is available for selection by a user may be restricted, based on the evaluation result of the user stored for every role. That is, a user may be able to select only a player character 38 assigned to a position (role) having an expected game play that the user has been able to perform in a game in the past.

Specifically, for example, in a case where a statistical value (for example, an average) of the evaluation values of a user gained when operating a forward (role) player character 38 is equal to or larger than a threshold, and a statistical value (for example, an average) of the evaluation values the user gained when operating a player character 38 assigned with a different position (role) is smaller than the threshold, the user may be able to select a forward player character 38 only.

Note that the upper limit participant number level of a user may be determined for every role, that is, every position. In this case, the upper limit participant number level relative to each position (role) is stored in the user table.

In this case, for example, as the match room screen 70 is displayed after selection of a position (role) to be assigned to a user, in the match room screen 70, whether or not to allow the user to enter each match room 72 is determined based on the upper limit participant number level of the user for that position (role).

[4] For example, the game space may be a virtual 2D space. That is, the position or the like of a character may be defined by two coordinates.

[5] A case in which the present invention is applied to a soccer game participated in by a plurality of users is mainly described in the above. However, the present invention can be applied to a game other than a soccer game. That is, the present invention can be applied to a game participated in by a plurality of users, with each user assigned a role. For example, the present invention can be applied to a role playing game or an action game participated in by a plurality of users. For example, in a role playing game, an occupation set for a game character corresponds to a "role".

Further, the present invention can be applied to a case in which a game participated in by a plurality of users is executed in a single (stand-alone) game device. In this case, the functional blocks shown in FIG. 10 are implemented by the control unit of the game device (a game control device).

While there have been described what are at present considered to be certain embodiments of the invention, it will be understood that various modifications may be made thereto, and it is intended that the appended claims coverall such modifications as fall within the true spirit and scope of the invention.

[Summary] Based on the above description, the present invention is understood such as mentioned below, for example.

A game system according to one aspect of the present invention is a game system (1) for executing a game for a plurality of users to participate in, the game system including an assigning unit (60) that assigns a role in the game to a user; an evaluation unit (64) that evaluates a game play of the user in the game, based on an evaluation criterion that is set based on the role assigned to the user by the assigning unit (60); and a limiting unit (66) that limits a number of users, other than the user, who are able to participate in the game in which the user participates, based on an evaluation result by the evaluation unit (64) on a game play of the user in a game in the past.

A control method for a game system according to another aspect of the present invention is a control method for a game system for executing a game for a plurality of users to participate in, the control method including assigning a role in the game to a user; evaluating a game play of the user in the game, based on an evaluation criterion that is set based on the role assigned to the user; and limiting a number of users, other than the user, who are able to participate in the game in which the user participates, based on an evaluation result on a game play of the user in a game in the past.

A game control device according to another aspect of the present invention is a game control device (10) for providing a game for a plurality of users to participate in, the game control device including an obtaining unit (66) that obtains content stored in a storage (15) that stores evaluation information on an evaluation result of a game play of a user in the game, the evaluation result being obtained by evaluating the game play of the user in the game based on an evaluation criterion that is set based on a role assigned to the user in the game; and a limiting unit (66) that limits a number of users, other than the user, who are able to participate in the game in which the user participates, based on the evaluation information of the user.

A control method for a game control device according to another aspect of the present invention is provided a control method for a game control device for providing a game for a plurality of users to participate in, the control method including obtaining content stored in a storage that stores evaluation information on an evaluation result of a game play of a user in the game, the evaluation result being obtained by evaluating the game play of the user in the game based on an evaluation criterion that is set based on a role assigned to the user in the game; limiting a number of users, other than the user, who are able to participate in the game in which the user participates, based on the evaluation information of the user.

A program according to another aspect of the present invention is a program for causing a computer to function as a game control device for providing a game for a plurality of users to participate in, the program causing the computer to obtain content stored in a storage (15) that stores evaluation information on an evaluation result of a game play of a user in the game, the evaluation result being obtained by evaluating the game play of the user in the game based on an evaluation criterion that is set based on a role assigned to the user in the game; and limit a number of users, other than the user, who are able to participate in the game in which the user participates, based on the evaluation information of the user.

A non-transitory computer readable information storage medium according to another aspect of the present invention is a non-transitory computer readable information storage medium storing the above mentioned program.

In one embodiment of the present invention, the game system may further include a setting unit (62) that sets a game plan which the user should follow in the game, wherein the evaluation unit (64) may evaluate the game play of the user in the game, based on the evaluation criterion that is set based on the role assigned to the user by the assigning unit (60) and the game plan set by the setting unit (62).

In one embodiment of the present invention, the limiting unit (66) may include a unit that determines a reference participant number, based on the evaluation result by the evaluation unit (64) on the game play of the user in the game in the past, and a unit that restricts the user from participating in a game in which a larger number of users than the reference participant number participate.

In one embodiment of the present invention, the limiting unit (66) may include a unit that determines a reference participant number, based on the evaluation result by the evaluation unit (64) on the game play of the user in the game in the past, and a unit that restricts a larger number of other users than the reference participant number from participating in the game in which the user participates.

In one embodiment of the present invention, the evaluation unit (64) may evaluate the game play of the user in the game, based on progress in accomplishing a task that is set based on the role assigned to the user by the assigning unit (60).

In one embodiment of the present invention, the evaluation unit (64) may include at least one of a first determination unit that determines whether or not the user performs a game play which the user should perform, the game play being set based on the role assigned to the user by the assigning unit (60), and a second determination unit that determines whether or not the user performs a game play which the user should not perform, the game play being set based on the role assigned to the user by the assigning unit (60), and the evaluation unit (64) may evaluate the game play of the user in the game based on at least one of determination results made by the first determination unit and the second determination unit, respectively.

What is claimed is:

1. A game system for executing a game for a plurality of users to participate in, the game system comprising:
   an assigning unit that assigns a role in the game to a user;
   an evaluation unit that evaluates a game play of the user in the game, based on an evaluation criterion that is set based on the role assigned to the user by the assigning unit; and
   a limiting unit that limits a number of users that are other than the user and are able to participate in the game in which the user participates, based on an evaluation result by the evaluation unit on a game play of the user in a game in the past,
   wherein in the case where the evaluation result is low such that the game playing performance level of the user is below a predetermined threshold, the limiting unit lowers a number of users that are other than the user and are able to participate in the game in which the user participates, as compared with the case where the evaluation result is high such that the game playing performance level of the user is at least at a predetermined threshold,
   wherein the game playing performance level of a malicious user that has performed a malicious game play is set to be below the predetermined threshold, said malicious game play being a play that the user should not perform, and
   wherein the evaluation unit determines, based on data that define a type of the malicious game play, whether the user has performed the malicious game play that belongs to the type and sets the game playing performance level of the user based on a determination result, to thereby set the game playing performance level of the malicious user that has performed the malicious game play to be below the predetermined threshold.

2. The game system according to claim 1, further comprising
   a setting unit that sets a game plan which the user should follow in the game,
   wherein
   the evaluation unit evaluates the game play of the user in the game, based on the evaluation criterion that is set based on the role assigned to the user by the assigning unit and the game plan set by the setting unit.

3. The game system according to claim 1, wherein the limiting unit includes
   a unit that determines a reference participant number, based on the evaluation result by the evaluation unit on the game play of the user in the game in the past, and
   a unit that restricts the user from participating in a game in which a larger number of users than the reference participant number participate.

4. The game system according to claim 1, wherein the limiting unit includes
   a unit that determines a reference participant number, based on the evaluation result by the evaluation unit on the game play of the user in the game in the past, and
   a unit that restricts a larger number of other users than the reference participant number from participating in the game in which the user participates.

5. The game system according to claim 1, wherein the evaluation unit evaluates the game play of the user in the game, based on progress in accomplishing a task that is set based on the role assigned to the user by the assigning unit.

6. The game system according to claim 1, wherein
the evaluation unit includes at least one of
  a first determination unit that determines whether or not the user performs a game play which the user should perform, the game play being set based on the role assigned to the user by the assigning unit, and
  a second determination unit that determines whether or not the user performs a game play which the user should not perform, the game play being set based on the role assigned to the user by the assigning unit, and
the evaluation unit evaluates the game play of the user in the game based on at least one of determination results made by the first determination unit and the second determination unit, respectively.

7. A control method for a game system for executing a game for a plurality of users to participate in, the control method comprising:
  assigning a role in the game to a user;
  evaluating a game play of the user in the game, based on an evaluation criterion that is set based on the role assigned to the user; and
  limiting a number of users that are other than the user and are able to participate in the game in which the user participates, based on an evaluation result on a game play of the user in a game in the past,
  wherein in the case where the evaluation result is low such that the game playing performance level of the user is below a predetermined threshold, a number of users that are other than the user and are able to participate in the game in which the user participates is lowered, as compared with the case where the evaluation result is high such that the game playing performance level of the user is at least at a predetermined threshold.

8. A game control device for providing a game for a plurality of users to participate in, the game control device comprising:
  an obtaining unit that obtains content stored in a storage that stores evaluation information on an evaluation result of a game play of a user in the game, the evaluation result being obtained by evaluating the game play of the user in the game based on an evaluation criterion that is set based on a role assigned to the user in the game; and
  a limiting unit that limits a number of users that are other than the user and are able to participate in the game in which the user participates, based on the evaluation information of the user,
  wherein in the case where the evaluation result is low such that the game playing performance level of the user is below a predetermined threshold, the limiting unit lowers a number of users that are other than the user and are able to participate in the game in which the user participates, as compared with the case where the evaluation result is high such that the game playing performance level of the user is at least at a predetermined threshold,
  wherein the game playing performance level of a malicious user that has performed a malicious game play is set to be below the predetermined threshold, said malicious game play being a play that the user should not perform, and
  wherein it is determined, based on data that define a type of the malicious game play, whether the user has performed the malicious game play that belongs to the type, and the game playing performance level of the user is set based on a determination result, to thereby set the game playing performance level of the malicious user that has performed the malicious game play to be below the predetermined threshold.

9. A control method for a game control device for providing a game for a plurality of users to participate in, the control method comprising:
  obtaining content stored in a storage that stores evaluation information on an evaluation result of a game play of a user in the game, the evaluation result being obtained by evaluating the game play of the user in the game based on an evaluation criterion that is set based on a role assigned to the user in the game; and
  limiting a number of users that are other than the user and are able to participate in the game in which the user participates, based on the evaluation information of the user,
  wherein in the case where the evaluation result is low such that the game playing performance level of the user is below a predetermined threshold, a number of users that are other than the user and are able to participate in the game in which the user participates is lowered, as compared with the case where the evaluation result is high such that the game playing performance level of the user is at least at a predetermined threshold,
  wherein the game playing performance level of a malicious user that has performed a malicious game play is set to be below the predetermined threshold, said malicious game play being a play that the user should not perform, and
  wherein it is determined, based on data that define a type of the malicious game play, whether the user has performed the malicious game play that belongs to the type, and the game playing performance level of the user is set based on a determination result, to thereby set the game playing performance level of the malicious user that has performed the malicious game play to be below the predetermined threshold.

10. A non-transitory computer readable information storage medium for storing a program for causing a computer to function as a game control device for providing a game for a plurality of users to participate in, the program causing the computer to:
  obtain content stored in a storage that stores evaluation information on an evaluation result of a game play of a user in the game, the evaluation result being obtained by evaluating the game play of the user in the game based on an evaluation criterion that is set based on a role assigned to the user in the game; and
  limit a number of users that are other than the user and are able to participate in the game in which the user participates, based on the evaluation information of the user,
  wherein in the case where the evaluation result is low such that the game playing performance level of the user is below a predetermined threshold, the program causes the computer to lower a number of users that are other than the user and are able to participate in the game in which the user participates, as compared with the case where the evaluation result is high such that the game playing performance level of the user is at least at a predetermined threshold,
  wherein the game playing performance level of a malicious user that has performed a malicious game play is set to be below the predetermined threshold, said malicious game play being a play that the user should not perform, and wherein it is determined, based on data that define a type of the malicious game play, whether the user has performed the malicious game play that belongs to the type, and the game playing performance level of the user is set based on a determination result, to thereby set the game playing performance level of the malicious user that has performed the malicious game play to be below the predetermined threshold.

11. The game system according to claim 1, wherein the game is a sports game, the assigning unit assigns at least one of plurality of positions in the sports game to the user, the evaluation criterion indicates a first game play that is a game play which the user should perform or a second game play that is a game play which the user should not perform, the first game play or the second game play is set based on the position assigned to the user, and the evaluation unit determines whether the first game play or the second game play is performed by the user to thereby evaluate a game play of the user.

12. The game system according to claim 1, wherein the assigning unit assigns at least one of plurality of occupations in a virtual game space to the user, the evaluation criterion indicates a first game play that is a game play which the user should perform or a second game play that is a game play which the user should not perform, the first game play or the second game play is set is set based on the occupation assigned to the user, and the evaluation unit determines whether the first game play or the second game play is performed by the user to thereby evaluate a game play of the user.

13. The game system according to claim 1, wherein the game playing performance level of a poorly trained user that cannot perform a game play properly is set to be below the predetermined threshold.

* * * * *